(No Model.)
D. M. ARMSTRONG.
STEAM COOKER.
No. 322,774. Patented July 21, 1885.
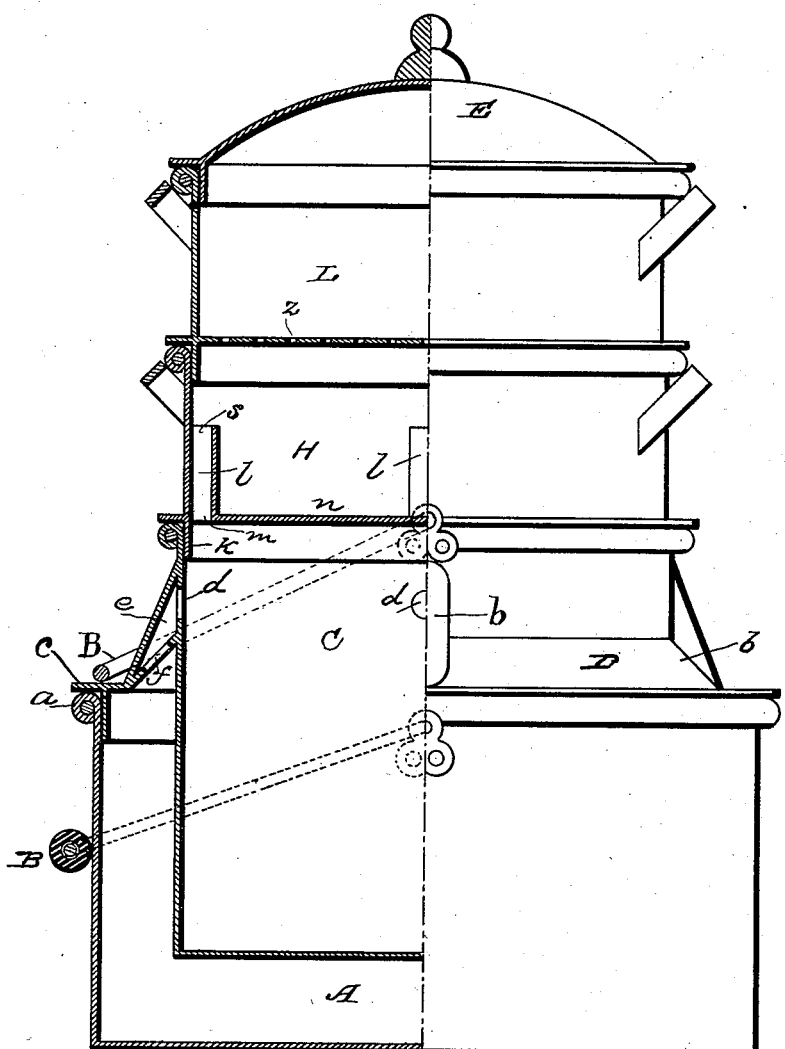

UNITED STATES PATENT OFFICE.

DAVID M. ARMSTRONG, OF ROANOKE, VIRGINIA.

STEAM-COOKER.

SPECIFICATION forming part of Letters Patent No. 322,774, dated July 21, 1885.

Application filed June 28, 1884. (No model.)

*To all whom it may concern:*

Be it known that I, DAVID M. ARMSTRONG, a citizen of the United States, residing at Roanoke city, in the county of Roanoke and State of Virginia, have invented certain new and useful Improvements in Steam-Cookers; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The figure of the drawing is a side view, partly in section, of my device.

This invention has relation to culinary implements adapted for cooking by steam; and it consists in the construction and novel arrangement of parts, as hereinafter set forth, and pointed out in the appended claims.

In the accompanying drawing, the letter A designates the bottom or main vessel, which is the boiler. This vessel is made of greater diameter than those which are designed to be superimposed, and it is provided with a bail, B.

C represents the second vessel, which is also provided with a bail, and is made deep, being designed to pass downward into the vessel A, and at the same time to have its upper portion extending above the level of the margin $a$ of the same. This vessel C is provided with a waist-flange, D, which extends around it, being downwardly and outwardly inclined, as shown at $b$. This flange is provided with a lip, $c$, which is designed to engage the marginal portion of the main vessel A. Near the upper edge of the vessel C openings $d$ are made in its wall, which form the upper mouths of the exterior inclined passages, $e$, which extend downward to the inclined flange D, in which the lower openings, $f$, of said passages are made. In this manner the interior of the vessel C is left without obstruction, this vessel being designed for cooking rice, potatoes, soups, &c. The cover E is adapted to be placed on the vessel C, or on either of the vessels F or G, which can be placed on the vessel C when advisable. The lower vessel, A, is provided with sufficient water to generate the steam required in cooking, said steam passing into the vessel C through the passages $e$.

If it be desired to cook other articles, the pans H are provided, each having a bottom lip-flange, $k$, to enter the mouth of the vessel below. At opposite points along the inner wall of the pan H extend vertically upward the passages $l$, which are formed by securing convex pieces of metal to said wall in connection with openings $m$ made in the bottom $n$ of said pan. These passages extend upward nearly to the top or upper margin of the wall of the pan, and are open at their upper ends, as shown at $s$. When placed over the vessel C, the steam from the latter, passing up through the passages $l$, serves to cook the article in the pan H. Several of these pans may be provided, one above another. The uppermost pan, L, is usually made with a perforated bottom, $z$, through which the steam passes from the pan next below.

The pans H and L are adapted to be interchangeably fitted to the vessel C, which is of much less diameter than the boiler A, and is fitted to the same by means of the waist-flange.

A sufficient quantity of water can be placed in the vessel A, and easily boiled, as said vessel is shallow and broad in form when compared with the vessel C.

Having described this invention, what I claim, and desire to secure by Letters Patent, is—

1. The combination, with the broad and shallow boiler vessel A, of the deep vessel C, having the inclined waist-flange D, formed with exterior inclined passages, $e$, opening through the flange at $f$, and into the vessel C at $d$, and with a lip, $c$, adapted to engage the marginal portion of the vessel A, substantially as specified.

2. The steam-cooking utensil herein described, consisting of the broad and shallow boiler A, the deep vessel C, formed with a waist-flange, D, fitting thereon, and provided with exterior passages, $e$, the pan H, fitting the mouth of the vessel C, and having the internal passages, $l$, and the pan L, having the perforated bottom $z$, substantially as specified.

In testimony whereof I affix my signature in presence of two witnesses.

DAVID M. ARMSTRONG.

Witnesses:
I. W. NEAL,
J. B. TRAYNHAM.